United States Patent
Perkalsky et al.

(10) Patent No.: US 11,317,128 B1
(45) Date of Patent: Apr. 26, 2022

(54) SYSTEMS, METHODS, AND DEVICES FOR MEDIA CONTENT TAMPER PROTECTION AND DETECTION

(71) Applicant: Synamedia Limited, Staines Upon Thames (GB)

(72) Inventors: Alexander Perkalsky, Jerusalem (IL); Nadav Angel, Jerusalem (IL); Eli Baruch, Mevaseret Zion (IL); Shay Gil, Tel Aviv (IL); Uri Porat, Modiin (IL); Max Sorkin, Mevaseret Zion (IL); Samie Beheydt, Geluwe (BE); Henk Derudder, Ypres (BE); Yosef Tsuria, Jerusalem (IL)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/079,025

(22) Filed: Oct. 23, 2020

(51) Int. Cl.
*H04N 7/167* (2011.01)
*H04N 21/2347* (2011.01)
(Continued)

(52) U.S. Cl.
CPC ........... *H04N 21/2347* (2013.01); *G08B 5/22* (2013.01); *H04L 9/3247* (2013.01);
(Continued)

(58) Field of Classification Search
CPC ............. H04N 21/2347; H04N 21/233; H04N 21/845; H04N 21/4343; H04N 21/23892;
(Continued)

(56) References Cited

U.S. PATENT DOCUMENTS

| 7,653,921 B2 * | 1/2010 | Herley | H04N 21/4756 725/19 |
| 8,712,156 B2 | 4/2014 | Bronstein et al. | |

(Continued)

OTHER PUBLICATIONS

Jon Sanchez et al., "The Aholab RPS SSD Spoofing Challenge 2015 submission", Sixteenth Annual Conference of the International Speech Communication Association, 2015, pp. 1-5.
(Continued)

*Primary Examiner* — Michael B. Pierorazio
(74) *Attorney, Agent, or Firm* — Fernando & Partners, LLP

(57) ABSTRACT

Techniques for media content tamper protection and detection are described. In some embodiments, the protection method is performed at an encoder. The encoder obtains a first sequence of signatures within a group of pictures and a second sequence of signatures for audio frames corresponding to the group of pictures. The encoder then combines the first sequence of signatures and the second sequence of signatures to generate a combined signature, and the combined signature is then embedded in a transport stream for transmission to a client device. In some embodiments, the detection method is performed at a client device, where the client device, in response to detecting a first message in the transport stream, starts calculation of signatures for a group of pictures and corresponding audio frames. The client device then uses the calculated signatures to validate an expected signature for the group of pictures and the corresponding audio frames.

20 Claims, 7 Drawing Sheets

(51) Int. Cl.

| | |
|---|---|
| *H04L 9/32* | (2006.01) |
| *H04N 21/234* | (2011.01) |
| *H04N 21/233* | (2011.01) |
| *H04N 21/236* | (2011.01) |
| *H04N 21/439* | (2011.01) |
| *H04N 21/434* | (2011.01) |
| *H04N 21/44* | (2011.01) |
| *H04N 21/845* | (2011.01) |
| *H04N 21/488* | (2011.01) |
| *G08B 5/22* | (2006.01) |
| *H04N 21/2389* | (2011.01) |
| *H04N 21/8358* | (2011.01) |
| *H04L 29/06* | (2006.01) |
| *H04N 21/2343* | (2011.01) |

(52) U.S. Cl.
CPC ....... *H04L 63/0428* (2013.01); *H04N 21/233* (2013.01); *H04N 21/2343* (2013.01); *H04N 21/23418* (2013.01); *H04N 21/23605* (2013.01); *H04N 21/23892* (2013.01); *H04N 21/4343* (2013.01); *H04N 21/4392* (2013.01); *H04N 21/4398* (2013.01); *H04N 21/44004* (2013.01); *H04N 21/4882* (2013.01); *H04N 21/8358* (2013.01); *H04N 21/845* (2013.01)

(58) Field of Classification Search
CPC ......... H04N 21/4882; H04N 21/23605; H04N 21/44004; H04N 21/23418; H04N 21/8358; H04N 21/4392; H04N 21/2343; H04N 21/4398
USPC .......................................................... 725/31
See application file for complete search history.

(56) References Cited

U.S. PATENT DOCUMENTS

| | | | | |
|---|---|---|---|---|
| 10,560,728 | B2* | 2/2020 | Cain | H04N 21/23608 |
| 2007/0124756 | A1* | 5/2007 | Covell | H04N 21/8106 |
| | | | | 725/18 |
| 2011/0129114 | A1* | 6/2011 | Colaitis | H04N 19/467 |
| | | | | 382/100 |
| 2013/0042262 | A1* | 2/2013 | Riethmueller | H04N 7/17318 |
| | | | | 725/14 |
| 2014/0196070 | A1* | 7/2014 | Moskowitz | H04N 21/8456 |
| | | | | 725/19 |
| 2015/0143416 | A1* | 5/2015 | Onno | H04N 21/44016 |
| | | | | 725/34 |
| 2018/0184160 | A1* | 6/2018 | Cain | H04N 21/8358 |
| 2018/0343481 | A1* | 11/2018 | Loheide | G06Q 30/0633 |
| 2019/0313161 | A1* | 10/2019 | Wilms | H04N 19/114 |
| 2019/0356966 | A1* | 11/2019 | Zuydervelt | H04N 21/4825 |

OTHER PUBLICATIONS

Arthur Janicki, "Spoofing Countermeasure Based on Analysis of Linear Prediction Error", Sixteenth Annual Conference of the International Speech Communication Association, 2015, pp. 1-5.
Tomi Kinnunen et al., "The ASVspoof 2017 Challenge: Assessing the Limits of Replay Spoofing Attack Detection", 2017, pp. 1-5.
Md Jahangir Alam et al., "Development of CRIM System for the Automatic Speaker Verification Spoofing and Countermeasures Challenge 2015", Sixteenth Annual Conference of the International Speech Communication Association, 2015, pp. 1-5.
Massimiliano Todisco et al., "Constant Q Cepstral Coefficients: A Spoofing Countermeasure for Automatic Speaker Verification", Computer Speech & Language, vol. 45, 2017, pp. 516-535.
Tanvina . Patel et al., "Combining Evidences from Mel Cepstral, Cochlear Filter Cepstral and Instantaneous Frequency Features for Detection of Natural vs. Spoofed Speech", Sixteenth Annual Conference of the International Speech Communication Association, 2015, pp. 1-5.
Jesus Villalba et al, "Spoofing Detection with DNN and One-class SVM for the ASVspoof 2015 Challenge", Sixteenth Annual Conference of the International Speech Communication Association, 2015, pp. 1-5.
Md Sahidullah et al., "A Comparison of Features for Synthetic Speech Detection", INTERSPEECH 2015, pp. 1-5.
Zhizheng Wu et al., "ASVspoof: the Automatic Speaker Verification Spoofing and Countermeasures Challenge", Journal of Latex Class Files, vol. 6, No. 1, Aug. 2016, pp. 1-18.
Zhizheng Wu et al., "ASVspoof 2015: the First Automatic Speaker Verification Spoofing and Countermeasures Challenge", Sixteenth Annual Conference of the International Speech Communication Association, 2015, pp. 1-5.
Longbiao Wang et al., "Relative phase information for detecting human speech and spoofed speech", Sixteenth Annual Conference of the International Speech Communication Association, 2015, pp. 1-5.
Xiong Xiao et al., "Spoofing Speech Detection Using High Dimensional Magnitude and Phase Features: the NTU Approach for ASVspoof 2015 Challenge", Sixteenth Annual Conference of the International Speech Communication Association, 2015, pp. 1-5.
Tomi Kinnunen et al., "Reddots replayed: A new replay spoofing attack corpus for text-dependent speaker verification research", 2017 IEEE International Conference on Acoustics, Speech and Signal Processing (ICASSP), IEEE, 2017, pp. 5395-5399.
Nanxin Chen et al., "Robust Deep Feature for Spoofing Detection— The SJTU System for ASVspoof 2015 Challenge", Sixteenth Annual Conference of the International Speech Communication Association, 2015, pp. 1-5.
Tomi Kinnunen et al., "The ASVspoof 2017 Challenge: Assessing the Limits of Replay Spoofing Attack Detection", INTERSPEACH 2017, 2017, Slide Presentation pp. 1-31.
Sergey Novoselov et al., "STC Anti-spoofing Systems for the ASVspoof 2015 Challenge", 2016 IEEE International Conference on Acoustics, Speech and Signal Processing (ICASSP), IEEE, 2016, pp. 1-5.
Shitao Weng et al., "The SYSU System for the Interspeech 2015 Automatic Speaker Verification Spoofing and Countermeasures Challenge", 2015 Asia-Pacific Signal and Information Processing Association Annual Summit and Conference (APSIPA), IEEE, 2015, pp. 1-5.
Yi Liu et al., "Simultaneous Utilization of Spectral Magnitude and Phase Information to Extract Supervectors for Speaker Verification Anti-spoofing", Sixteenth Annual Conference of the International Speech Communication Association, 2015, pp. 1-5.
Hadopi, "Content Recognition Tools: State of the Art and Deployment", Retrieved from the Internet Oct. 2020: www.hadopi.fr, pp. 1-34.
Hadopi, "Content Recognition Tools: State of the Art and Deployment", Retrieved from the Internet Oct. 2020: www.hadopi.fr, pp. 1-28.
French Ministry of Culture, "Mission Report: Towards more effectiveness of copyright law on online content sharing platforms: Overview of content recognition tools and possible ways forward", Nov. 2019, pp. 1-153.
Raahat Devender Singh et al., "Video content authentication techniques: a comprehensive survey", Multimedia System, vol. 24, 2018, pp. 211-240.

* cited by examiner

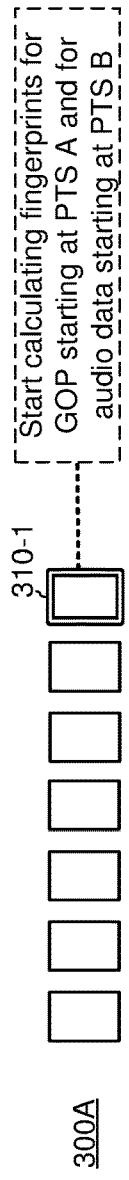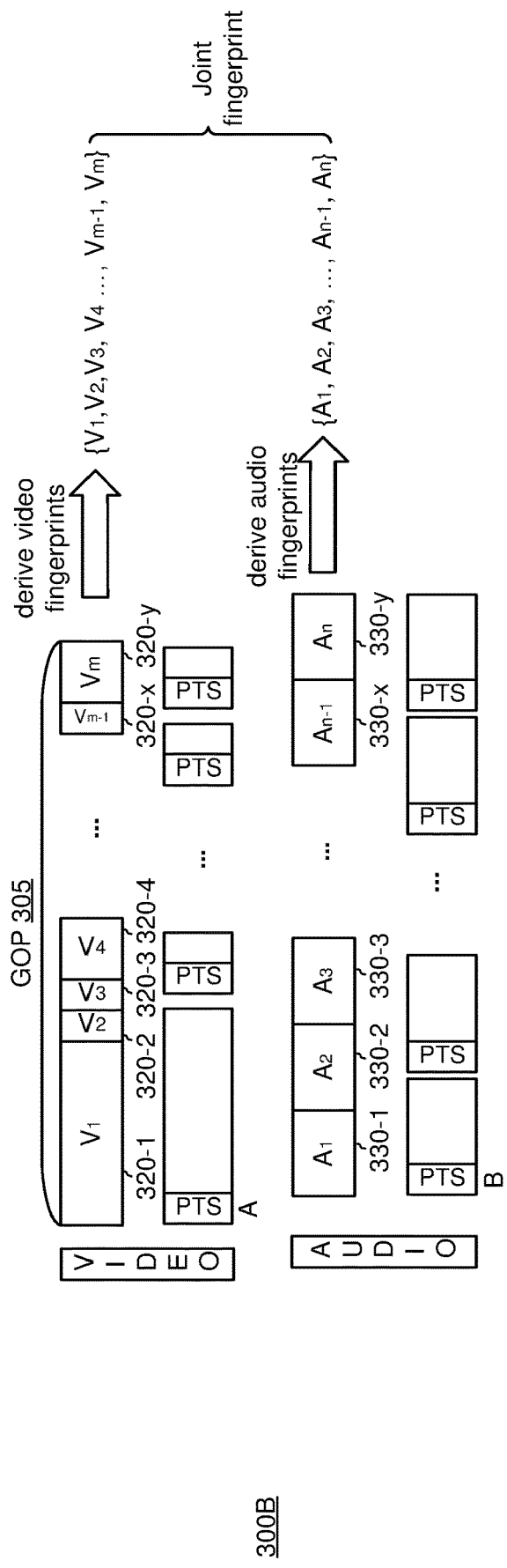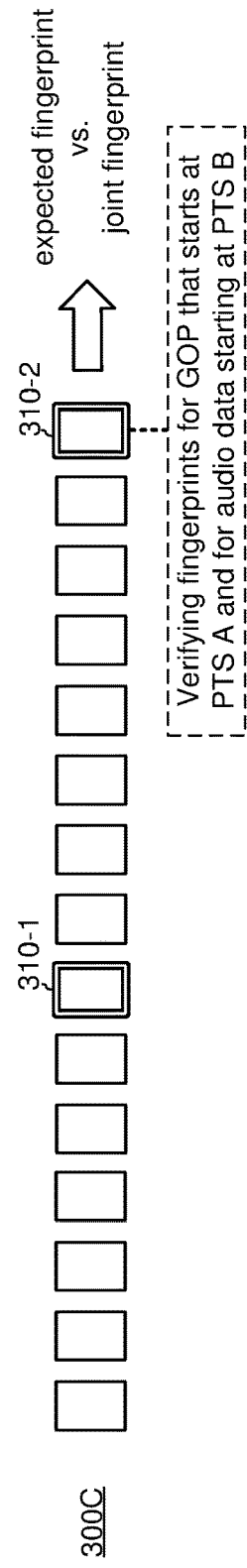
Figure 3A
Figure 3B
Figure 3C

SYSTEMS, METHODS, AND DEVICES FOR MEDIA CONTENT TAMPER PROTECTION AND DETECTION

TECHNICAL FIELD

The present disclosure relates generally to media content tamper protection.

BACKGROUND

Technological advances in recent years allow for modification of video and/or audio content at such a level that it is difficult to detect the changes. For instance, fake media content, e.g., deepfake or audio spoofing, makes a person appear to do or say something that they did not. Malicious users may then use the fake information to cause harm.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 3A-3C are diagrams illustrating media content tamper detection at a client device, in accordance with some embodiments;

Figure 1:
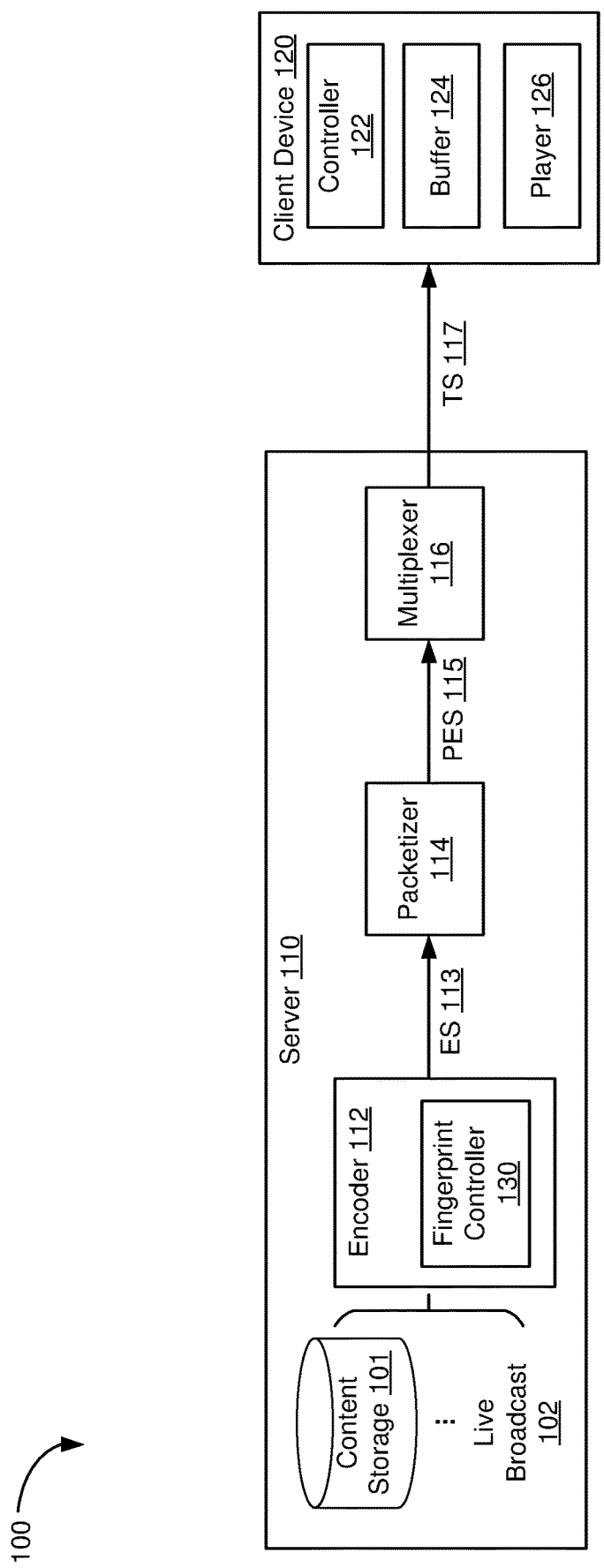
FIG. 1 is a block diagram of an exemplary media content tamper protection and detection system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

OVERVIEW

A tamper protection method performs real time fingerprinting of video and audio content and sends fingerprints to a client device (either within a transport stream or using a separate path such as in a separate message). Such a method allows the client device to verify the content (e.g., video and/or audio) in real time. To bind the video and audio streams for tamper protection, at the encoding stage, an encoder gathers unique characteristics of the video and the audio data and creates a joint signature for each video and audio pair associated with a group of pictures. The encoder protects the joint signature with security in some embodiments and embeds the joint signature in real time into the transport stream along with signaling packets to the client device.

On the client side, upon receiving the packets, the client device locates the signaling packet with a first message instructing the client device to start calculating signatures for the video and audio pair. In response to detecting the first message, the client device retrieves from its history buffer the video and audio pair and calculates signatures for the video and audio pair. The client device then receives a second message instructing the client device to verify an expected signature for the video and audio pair. In response to receiving the second message, the client device uses the calculated signatures to verify the expected signature for determining whether any alternation to the media content has occurred.

In accordance with various embodiments, a tamper protection method is performed at a device (e.g., a device with an encoder) with one or more processors and a non-transitory memory. The method includes obtaining a first sequence of signatures within a group of pictures, where a respective signature in the first sequence of signatures represents a characteristic of a respective video frame in the group of pictures. The method further includes obtaining a second sequence of signatures for audio frames corresponding to the group of pictures. The method also includes combining the first sequence of signatures and the second sequence of signatures to generate a combined signature for the group of pictures and the audio frames corresponding to the group of pictures. The method additionally includes embedding the combined signature in a transport stream for transmission.

In accordance with various embodiments, a tamper verification method is performed at a device (e.g., a client device) with a processor and a non-transitory memory, where the non-transitory memory includes a buffer for storing at least a portion of a video stream and an audio stream. The method includes detecting a first message instructing the device to start calculation of fingerprints for a group of pictures starting at a first timestamp in the video stream and corresponding audio frames starting at a second timestamp in the audio stream. In response to detecting the first message, the method also includes obtaining, from the buffer, video packets for the group of pictures starting at the first timestamp and audio packets for the corresponding audio frames starting at the second timestamp. Further in response to detecting the first message, the method includes deriving, from the video packets, a first sequence of signatures for the group of pictures and deriving, from the audio packets, a second sequence of signatures for the corresponding audio frames. The method also includes detecting a second message including an expected signature for the group of pictures and the corresponding audio frames. The method additionally includes validating the expected signature based on the first sequence of signatures and the second sequence of signatures in response to detecting the second message.

Example Embodiments

Some previously existing tamper protection solutions fingerprint an entire video and upload the fingerprints to a server for verification. Such solutions have a limited range of applications due to the high usage of computational resources and network bandwidth. The media content tamper protection systems, methods, and devices described herein perform real time fingerprinting of video and audio content and send fingerprints corresponding to selected video and audio pairs to a client device (e.g., within the transport stream and/or using a separate path). This allows the client device to verify media content tampering (video and/or audio) in real time, thus expanding the application range to live broadcast.

Reference is now made to FIG. 1, which is a block diagram of an exemplary media content tamper protection and detection system 100 in accordance with some embodiments. In some embodiments, the system 100 includes a server 110 (e.g., including one or more servers) and at least one client device 120. In some embodiments, the server 110 includes an encoder 112, which encodes one or more media content items from content storage 101 and/or live broadcast 102 to component elementary stream(s) 113. The elementary stream(s) 113 are then packetized by a packetizer 114 to generate packetized elementary stream(s) 115 before being packaged by a multiplexer 116 into transport stream(s) 117 for transmission. Though not shown in FIG. 1, the server 110 also generates (e.g., with a playlist and/or digital rights management controller) and transmits (e.g., with a network interface and/or a transmitter) playlist(s) and/or metadata for the media content item(s) in addition to the transport stream(s) 117.

In some embodiments, a media content item (also referred to as "a content item"), which can be stored in the content storage 101 (e.g., from a pre-recorded source) and/or from the live broadcast 102, includes suitable data of various formats, for example, visual data, audio data, and/or metadata, etc. In some embodiments, the content item prior to feeding to the encoder 112 is clear (e.g., raw content without being compressed), thus allowing the server 110 to reuse, encode, and/or package the content item in different formats. For instance, the content item can be encoded as MPEG-2, MPEG-4, MP3, AC-3, and/or any other suitable format.

On the client side, in some embodiments, the client device 120 includes at least a controller 122 (or a processor), a buffer 124 (e.g., as part of a non-transitory memory), and a player 126. Upon receiving the transport stream(s) 117 from the server 110, the client device 120 stores at least a portion of the packets from the transport stream(s) 117 in the buffer 124. In some embodiments, the buffer 124 is a cyclical buffer for maintaining a history of the received media content. In some embodiments, the buffer size is large enough to fit the packets that represent the duration of at least two groups of pictures (GOPs). In some embodiments, as will be described in detail below, the controller 122 facilitates packet decoding and verification. Once decoded and verified, the player 126 plays the decoded packets, e.g., rendering images on a display and/or outputting audio.

It should be noted that although FIG. 1 illustrates packaging and transmitting the transport stream(s) 117, the encoding, packaging, and/or decoding processes are not limited to MPEG-2 protocol. A variety of audio and video streaming formats can be encoded, packaged, transmitted, and/or decoded. For example, standard definition (SD) services tend to use MPEG-2 for video and MPEG-1 for audio. In another example, high definition (HD) services tend to use advanced video coding (AVC) for video and AC3 format for audio. In some embodiments, HD services may also have MPEG-1 audio tracks for narrative tracks for the visually impaired. In yet another example, ultra high definition (UHD) services tend to use high efficiency video coding (HEVC) for video and AC3 format for audio. Further, HTTP Live Streaming (HLS), Dynamic Adaptive Streaming over HTTP (DASH), or other protocols for Adaptive Bitrate Streaming (ABR) can be used for playlist support. In another example, for SD or HD content, MP2 transport stream (TS) can be used as the container format in accordance with some embodiments; and for UHD content, fragmented MP4 (FMP4) can be used as the container format. Thus, the media content tamper protection and detection method in accordance with various embodiments can be applied to any definition (e.g., SD, HD, and/or UHD), any encoding protocols, container formats, playlist supports, and/or encryption supports.

To tamper protect the content item, in some embodiments, the encoder 112 includes a fingerprint controller 130 for gathering characteristics that uniquely identify the video and audio stream(s). The fingerprint controller 130 then creates a joint fingerprint of each video and audio pair and protects the joint fingerprint with added security in some embodiments. As used hereinafter, the terms "fingerprint" and "signature" are used interchangeably representing unique traits, properties, parameters, and/or characteristics of video and/or audio data. In some embodiments, the fingerprint controller 130 coordinates with the packetizer 114 and/or the multiplexer 116 to embed the joint fingerprints in real time into the transport stream(s) 117 along with signaling to the client device 120. Such a tamper protection process efficiently embeds fingerprints and binds the video and audio stream(s) in real time in preparation for verification.

To verify whether the content item has been tampered, the client device 120, in some embodiments, reads signaling packets within the transport stream(s) 117. In some embodiments, the signaling packets include an expected fingerprint for a video and audio pair. In the case of added security, e.g., the expected fingerprint is encrypted, the client device 120 (e.g., the controller 122) decrypts the expected fingerprint. According to the commands in the signaling packets, the client device 120 gathers characteristics that uniquely identify the video and audio pairs(s), e.g., by retrieving the packets from the buffer 124 that correspond to a chosen video and audio pair, and calculates a joint fingerprint for the video and audio pair. Further according to the commands in the signaling packets, the client device 120 compares the calculated fingerprint with the expected fingerprint to determine whether tampering of the media content has occurred. Such a tamper verification process allows the client device to efficiently detect tampering in real time.

It should be noted that the exemplary media content tamper protection and verification system 100 can include more, less, and/or different elements than shown in FIG. 1. For example, the server 110 can include one or more network interfaces and/or transmitters for transmitting the packets to the client device 120. Likewise, the client device 120 can include one or more network interfaces and/or receivers for receiving the packets from the server 110. Further, each of the elements in the exemplary system 100 can include appropriate hardware, software, and/or firmware to perform the operations attributed to the element herein. Some examples of appropriate hardware, software, and/or firmware for certain elements will be provided further below. Operation(s) attributed to an element in the exemplary system 100 herein should not be considered binding and in some embodiments, other element(s) in the exemplary system 100 may additionally or alternatively perform such operation(s).

Further, though FIG. 1 illustrates a single client device 120, the system 100 may include one or more client devices 120 for receiving the streaming media content from the server 110 (e.g., a headend including one or more servers). For the sake of simplicity, the subject matter will be described hereinafter for the most part with reference to a single server 110 and a single client device 120. Likewise, references herein to the encoder 112, fingerprint controller 130, packetizer 114, and/or multiplexer 116 in the single form cover embodiments where there is a single encoder 112, fingerprint controller 130, packetizer 114, and/or multiplexer 116 as well as embodiments where there is a plurality of encoders 112, fingerprint controllers 130, packetizers 114, and multiplexers 116. Additionally, references herein to the elementary stream 113, packetized elementary stream 115, and/or the transport stream 117 in the single form cover embodiments where there is a single elementary stream 113, packetized elementary stream 115, and/or the transport stream 117 as well as embodiments where there is a plurality of elementary streams 113, packetized elementary streams 115, and/or the transport streams 117.

Figure 2:
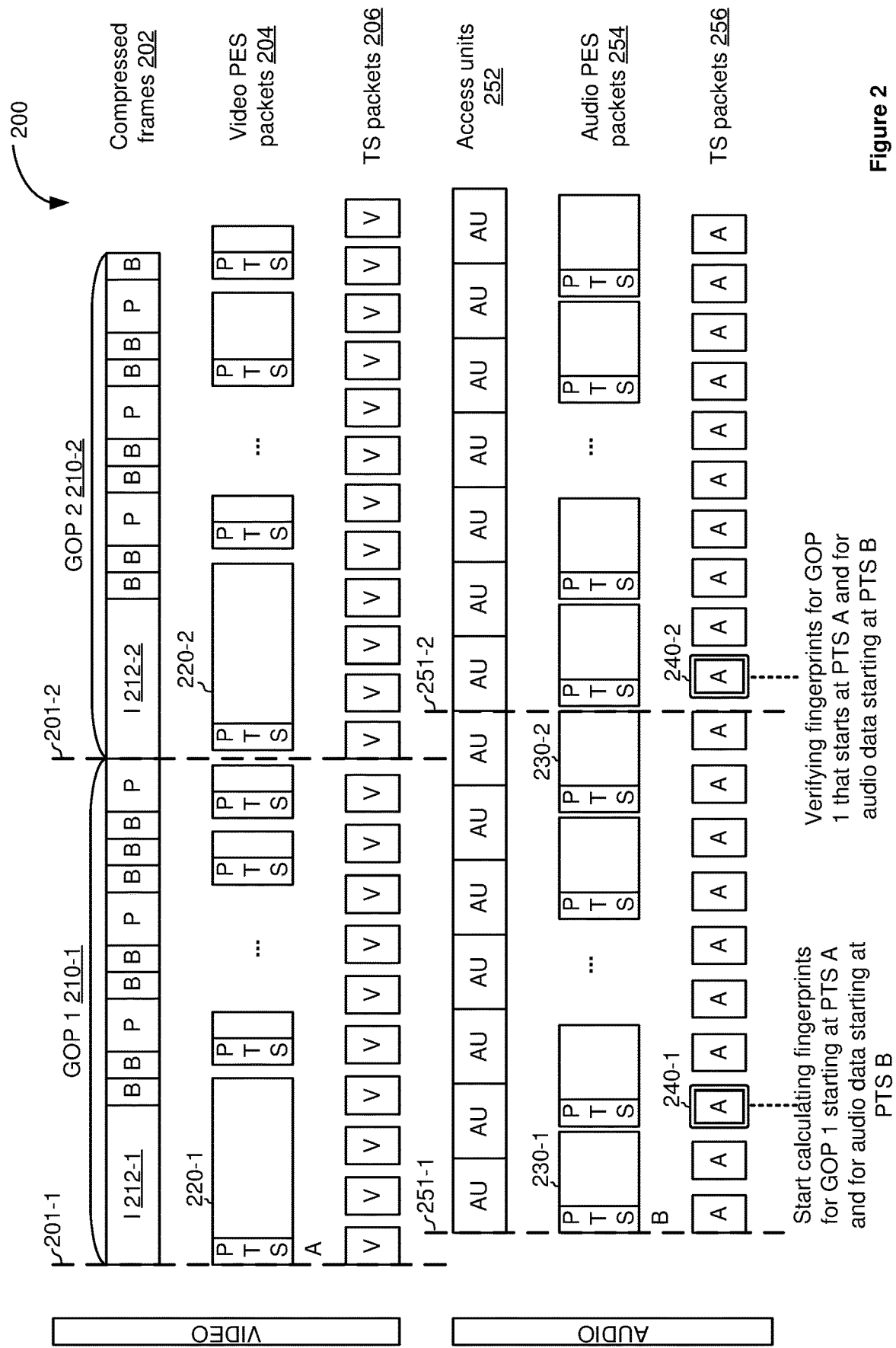
FIG. 2 is a diagram illustrating tamper protection of media content during encoding, in accordance with some embodiments.

FIG. 2 is a diagram 200 illustrating tamper protection of media content during encoding (e.g., by the fingerprint controller 130 of the encoder 112 in FIG. 1) in accordance with some embodiments. A video elementary stream (ES) (e.g., one of the elementary streams 113 in FIG. 1) includes a sequence of compressed data output (e.g., compressed video frames) from a video encoder (e.g., one of the encoders 112 in FIG. 1). In some embodiments, compressed video frames 202 are regarded as a sequence of groups of pictures (GOPs), e.g., GOP 1 210-1 and GOP 2 210-2, collectively referred hereinafter to as GOPs 210. In FIG. 2, a dashed line 201-1 indicates the beginning of GOP 1 210-1 and a dashed line 201-2 indicates the end of GOP 1 210-1, which coincides with the beginning of GOP 2 210-2. Each of the GOPs 210 includes a plurality of frames. For example, GOP 1 210-1 includes one I-frame 212-1 followed by multiple B-frames and P-frames. In another example, GOP 2 210-2 includes another I-frame 212-2 followed by a plurality of B-frames and P-frames.

Certain characteristics of the video frames are unique and unpredictable for each of the GOPs 210. Such characteristics can become fingerprints for tamper protection. For example, the picture size parameter of the frames cannot be predicted as it depends on encoder model, software version, picture type (e.g., I-frame vs. P-frame vs. B-frame), video content (e.g., detailed vs. few details), and/or video characteristics (e.g., static video vs. fast moving video). The sequence of the picture sizes within a given GOP thus provides a unique fingerprint for the GOP. In addition to or in place of using the picture size for fingerprints, other traits, characteristics, properties, and/or parameters of the video data can be used as fingerprints. Such traits, characteristics, properties, and/or parameters include, but are not limited to, XOR certain bits or bytes of the video data, color or gray-level properties (e.g., histogram, hue, saturation), color distribution, and/or or arrangement of objects inside frames. Further, such traits, characteristics, properties, and/or parameters can be at the pixel level, block level, whole picture level, and/or parts of the image level, among others. Additionally, the traits, characteristics, properties, and/or parameters can be extracted from key frames, a subset of frames, or all frames.

As explained above with reference to FIG. 1, the packetizer 114 packages the ES 113 into packets of the packetized elementary stream (PES) 115, e.g., packaging the compressed frames 202 into video PES packets 204 in FIG. 2. As shown in FIG. 2, the video PES packets 204 have variable lengths. The size of each of the video PES packets 204 does not correspond to the fixed packet length of the transport packets 206 and may be much longer than a transport packet. The header of each video PES packet 204 typically includes a stream identifier (e.g., 8-bit) identifying the source of the payload. Among other things, in some embodiments, the PES packet header also includes timing references, such as a presentation timestamp (PTS) and a decoding timestamp (DTS). The PTS value uniquely marks the respective GOP within the video stream.

For example, the PTS value for a first video PES packet 220-1 uniquely marks GOP 1 210-1 within the video stream starting at presentation timestamp A, e.g., along the dashed line 201-1. In another example, the PTS value for another video PES packet 220-2 uniquely marks the beginning of GOP 2 210-2 within the video stream, e.g., along the dashed line 201-2. Once the video PES packets 204 are created from the elementary stream, the video PES packets 204 are encapsulated inside transport stream (TS) packets 206 (or program stream (PS) packets). The TS packets 206 can then be multiplexed (e.g., by the multiplexer 116 in FIG. 1) and transmitted.

For audio data, the compressed audio stream (e.g., an audio ES) that is associated with the GOPs 210 is logically divided into fixed size blocks (e.g., by the encoder 112 in FIG. 1) as access units 252 (also referred to hereinafter as the "audio frames"). The packetizer (e.g., the packetizer 114 in FIG. 1) then generates a sequence of audio PES packets 254 from the access units 252. Each of the audio PES packets 254 has a PES packet header, which includes a presentation timestamp (PTS). Among the sequence of audio PES packets 254, a group of access units corresponding to GOP 1 210-1 is packetized into a group of audio PES packets with an audio PES packet 230-1 with the smallest PTS value at presentation timestamp B, e.g., as indicated by a dashed line 251-1.

In FIG. 2, the corresponding audio data for GOP 1 210-1 is identified between dashed lines 251-1 and 251-2. Due to the processing of video data and the corresponding audio data, e.g., 20 ms interval between video frames vs. 21.33 ms audio access unit interval for advanced audio coding (AAC) audio data, the video data often precedes the corresponding audio data, e.g., by approximately 1 second. As such, the corresponding part of the audio stream identified by its own PTS is close to the corresponding video PTS, but not necessarily the same. For example, in FIG. 2, the audio PES packet 230-1 with the smallest PTS at point B has its PTS value greater than or equal to the PTS value for the video PES packet 220-1 at point A.

In some embodiments, for tamper protection, the fingerprint for audio is obtained by reading the data values at certain locations in the group of access units 252 corresponding to the given GOP 1 210-1, e.g., byte 2, 5, 16, etc. In some other embodiments, to strengthen the fingerprint, the sequence of fingerprint values of the video frames, e.g., the sequence of picture size values, is used as the addresses for location these specific locations. The data values at the identified locations in the audio data are read and become the sequence of fingerprints for the audio data. In some embodiments, other characteristics of the audio data, e.g., extracting data associated with a frequency and/or amplitude from the audio, can be used in place of or in conjunction with the fingerprint described herein.

In some embodiments, a joint fingerprint for the video and audio pair corresponding to GOP 1 210-1 is calculated by applying a function to the sets of fingerprint values (e.g., the picture size values and/or other video frame parameters) for the group of video PES packets between the dashed lines 201-1 and 201-2 and the fingerprint sequence for the corresponding audio PES packets between the dashed lines 251-1 and 251-2. To prevent the joint fingerprint from being modified during transmission, an optional security measure can be applied for improved security, e.g., by applying one or a combination of the existing cryptography and/or fingerprinting schemes, e.g., including, but not limited to, AES, RC4, XOR, RSA, etc. In the case of the client device being a trusted device, a symmetric cryptography and/or fingerprint scheme can be used. In some other embodiments, an asymmetric or a combination of asymmetric and symmetric cryptography and/or fingerprint scheme can be used. For instance, an asymmetric cryptography scheme can be used for periodically sending and/or protecting a symmetric key delivery to the client device, while the fingerprint for tamper verification is protected by a symmetrical cryptography scheme.

In some embodiments, the tamper protection process is orchestrated by the encoder (e.g., the fingerprint controller 130 of the encoder 112 in FIG. 1). The fingerprint controller decides when to insert the fingerprints to be verified to the transport stream(s). Once a GOP to be verified is selected, the corresponding video and audio PTS values are stored in non-transitory memory associated with the encoder in accordance with some embodiments. Upon transmission, the audio PES packets 254 are repackaged into a series of TS packets 256, e.g., by the multiplexer 116 in FIG. 1. Among the TS packets 256, in some embodiments, the fingerprint controller 130 causes control messages and the fingerprints to be carried by signaling packets in the transport stream and delivered to the client device. In some embodiments, additional TS packets, e.g., the signaling packets 240-1 and 240-2 are injected into the transport stream, where the signaling packets 240-1 and 240-2 include commands and/or messages instructing the client device to perform tamper detection.

In some embodiments, a first signaling packet 240-1 is inserted at the end of the first audio PES packet 230-1 corresponding to the selected GOP 1 210-1. The control message (also referred to hereinafter as the "command" or "message") in the first signaling packet 240-1 instructs the client device to start calculations of fingerprints for GOP 1 210-1 starting at PTS A (e.g., causing the client device to derive fingerprints for the video data between the dashed lines 201-1 and 201-2) and start calculations of fingerprints for the corresponding audio PES packets starting at PTS B (e.g., triggering the client device to derive the fingerprints for audio data between the dashed lines 251-1 and 251-2). Upon receiving the first signaling packet 240-1, the client device starts to calculate fingerprints for the selected video and audio pair, while in parallel, the encoder continues to collect the fingerprints from the streamed media content for the selected video and audio pair in preparation for composing a combined signature to be embedded in a second signaling packet 240-1.

In some embodiments, the second signaling packet 240-2 is inserted at the end of the last audio PES packet 230-2 corresponding to the selected GOP 1 210-1. In some embodiments, the second signaling packet 240-2 includes the expected fingerprint for the video and audio pair starting at PTS A and PTS B, respectively. Further, the control message in the second signaling packet 240-2 instructs the client device to verify the fingerprint for GOP 1 210-1 starting at PTS A, e.g., starting to verify the video frames 202 between the dashed lines 201-1 and 201-2. Further, the control message in the second signaling packet 240-2 instructs the client device to verify the corresponding audio data starting at PTS B, e.g., starting to verify the access units 252 between the dashed lines 251-1 and 251-2. In some embodiments, for sequential operation, one signaling packet can carry more than one command. For example, in addition to the one control message instructing the client device to start calculating the fingerprint for GOP 2 210-2 and its corresponding audio data, the second signaling packet can also include another control message instructing the client device to verify the fingerprint for GOP 1 210-2 and its corresponding audio data.

As shown in FIG. 2, appending the first signaling packet 240-1 to the first audio PES packet 230-1 and appending the second signaling packet 240-2 to the last audio PES packet 230-2 in accordance with some embodiments facilitate tamper protection and detection in real time. As explained above, the media content is often encoded and packaged in a way such that the video data precedes the corresponding audio data. As a result, when the client device receives the first audio PES packet 230-1, it has already received some video data for the corresponding GOP. Therefore, upon receiving the first signaling packet 240-1, the client device can start locating the video and audio pair (e.g., locating the video data starting at PTS A and the corresponding audio data starting at PTS B in its buffer) and start calculating fingerprints for the video and audio pair. In parallel, as the client device receives more video and audio packets for the selected video and audio pair, the client continues calculating fingerprints in the fingerprint sequence in real time.

For the same reasons, because the video data are often transmitted ahead of the corresponding audio data, upon receiving the last audio PES packet 230-2, the client device has obtained both the video TS packets starting at PTS A between the dashed lines 201-1 and 201-2 and the corresponding audio TS packets starting at PTS B between the dashed lines 251-1 and 251-2. Thus, upon receiving the second signaling packet 240-2, the client device can verify the joint fingerprint immediately. As such, appending the second signaling packet 240-2 to the last audio PES packet 230-2 allows the client device to detect tampering as soon as it has received the video and audio pair.

FIGS. 3A-3C are diagrams 300A-300C illustrating media content tamper detection at a client device (e.g., at the client device 120 and by the controller 122 in FIG. 2) in accordance with some embodiments. On the client end, the client device (e.g., the client device 120 in FIG. 1) maintains a cyclical buffer (e.g., the buffer 144 in FIG. 1) for keeping a history of TS packets. In some embodiments, the buffer size is large enough to fit the packets that represent the duration of at least two GOPs, e.g., at least large enough to fit GOP 1 210-1 and GOP 2 210-2 in FIG. 2.

As shown in FIG. 3A, the client device scans the incoming TS packets and identifies a signaling packet 310-1. In response to detecting the signaling packet 310-1, the client device reads the control message in the signaling packet 310-1. As shown in FIG. 3B, in the case of the control message including a command requesting the client device to start calculating fingerprints for a GOP starting at PTS A and for the corresponding audio PES starting at PTS B, the client device collects characteristics of the video and audio pair starting at PTS A and PTS B respectively and calculates a joint fingerprint for the pair as a function of the characteristics of the video and audio data.

For example, in FIG. 3B, in response to receiving the control message, the client device locates PTS A in the buffered video data for a GOP 305. Further, as indicated by the arrow, the client device derives properties, parameters, and/or characteristics of a plurality of video frames $V_1$ 320-1, $V_2$ 320-2, $V_3$ 320-3, $V_4$ 320-4, . . . , $V_{m-1}$ 320-x, and $V_m$ 320-y (collectively referred to hereinafter as the plurality of video frames 320) that starts from PTS A as video fingerprints. In FIG. 3B, the sequence of fingerprints for the plurality of video frames 320 is denoted as $\{V_1, V_2, V_3, V_4, \ldots, V_{m-1},$ and $V_m\}$. As such, the sequence of fingerprints $\{V_1, V_2, V_3, V_4, \ldots, V_{m-1},$ and $V_m\}$ represents unique properties, parameters, and/or characteristics (e.g., picture sizes) of the plurality of video frames 320.

Also as shown in FIG. 3B, in response to receiving the control message, the client device locates PTS B in the stored audio data. As indicated by the arrow, the client device further derives properties, parameters, and/or characteristics of a plurality of audio frames $A_1$ 330-1, $A_2$ 330-2, $A_3$ 330-3, . . . , $A_{n-1}$ 330-x, and $A_n$ 330-y (collectively referred to hereinafter as the plurality of audio frames 330) corresponding to the GOP 305 starting at PTS B as audio fingerprints. In FIG. 3B, the sequence of fingerprints for the plurality of audio frames 330 is denoted as $\{A_1, A_2, A_3, \ldots, A_{n-1},$ and $A_n\}$. In some embodiments, the sequence of fingerprints $\{A_1, A_2, A_3, \ldots, A_{n-1},$ and $A_n\}$ represents data values at certain locations in the group of audio frames 330. The client device further calculates a joint fingerprint for the video and audio pair based on the sequence of video fingerprints and the sequence of audio fingerprints, e.g., a joint fingerprint as a function of $\{V_1, V_2, V_3, V_4, \ldots, V_{m-1},$ and $V_m\}$ and $\{A_1, A_2, A_3, \ldots, A_{n-1},$ and $A_n\}$.

In FIG. 3C, in the case of receiving a control message in a signaling packet 310-2 instructing the client device to verify the fingerprints for the GOP 305 that starts at PTS A and for the corresponding audio frames that start at PTS B, the client device compares the calculated joint fingerprint with an expected fingerprint in the signaling packet 310-2. In some embodiments, mismatched fingerprints indicate the video and/or audio data have been tampered with. In some embodiments, in response to the mismatched fingerprints, the client device takes appropriate actions, such as generating and/or displaying an alert (e.g., displaying the alert to the user with the player 126 in FIG. 1). In some embodiments, the alert includes the client device blocking or obscuring the viewing of the media content item to stop the consumption of the tampered media content. In some embodiments, when the expected fingerprint is encrypted and/or signed, the client device decrypts according to the cryptography scheme in use prior to verifying the expected fingerprint, e.g., by applying a symmetric key and/or a private key.

Figure 4:
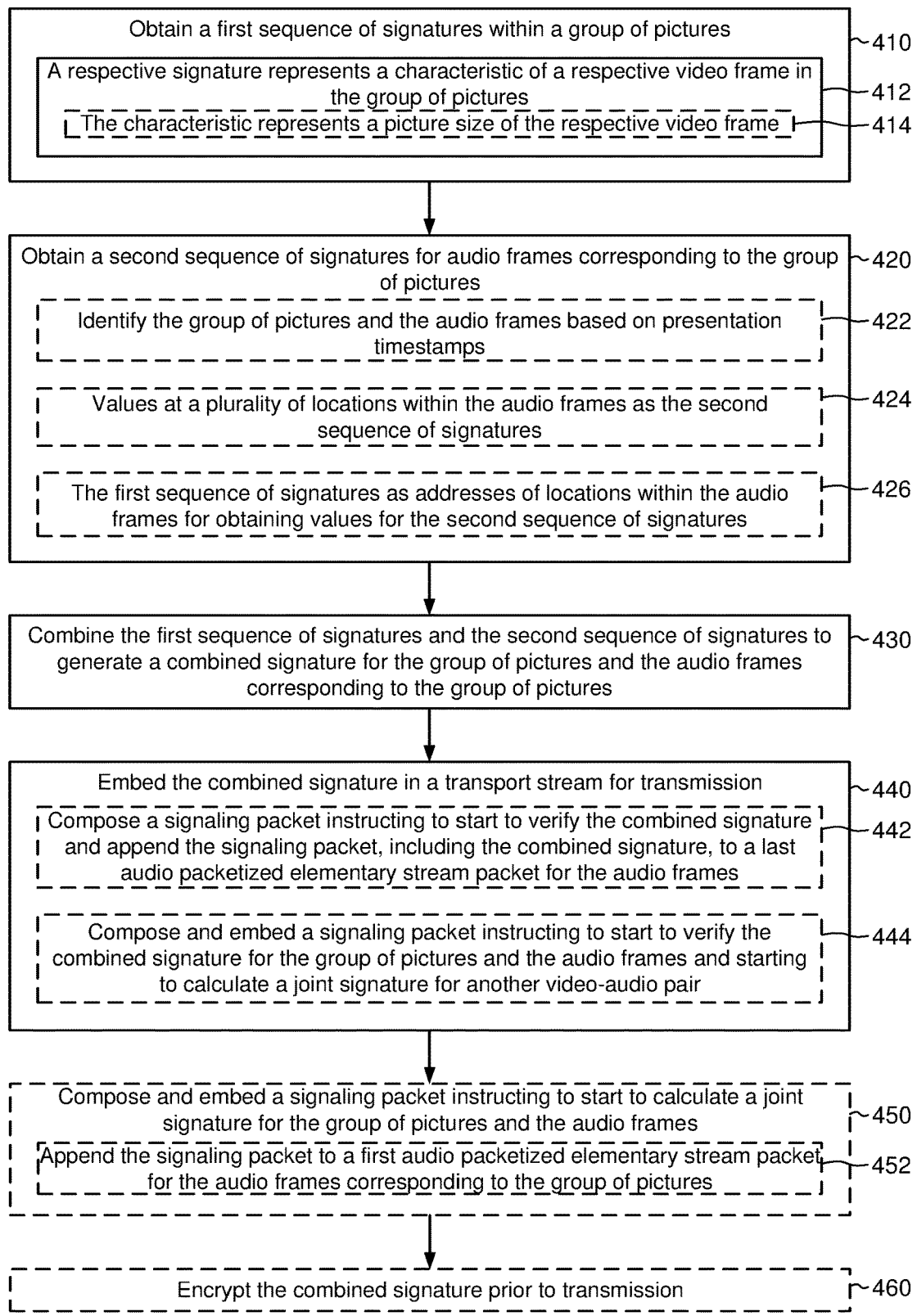
FIG. 4 is a flowchart illustrating an exemplary tamper protection method, in accordance with some embodiments.

FIG. 4 is a flowchart illustrating a tamper protection method 400 in accordance with some embodiments. In some embodiments, the tamper protection method 400 is performed at an encoder, e.g., with the fingerprint controller 130 at the encoder 112 on the server 110 in FIG. 1, where the server 110 includes one or more processors for performing the fingerprinting function and at least one non-transitory storage to facilitate the tamper protection. Briefly, the method 400 includes obtaining a first sequence of signatures within a group of pictures, wherein a respective signature in the first sequence of signatures represents a characteristic of a respective video frame in the group of pictures; obtaining a second sequence of signatures for audio frames corresponding to the group of pictures; combining the first sequence of signatures and the second sequence of signatures to generate a combined signature for the group of pictures and the audio frames corresponding to the group of pictures; and embedding the combined signature in a transport stream for transmission.

To that end, as represented by block 410, the method 400 includes obtaining a first sequence of signatures within a group of pictures. In some embodiments, as represented by block 412, a respective signature in the first sequence of signatures represents a characteristic of a respective video frame in the group of pictures. Further, as represented by block 412, in some embodiments, the characteristic of the respective video frame represents a picture size of the respective video frame.

For example, as shown in FIG. 2, the picture size of the I-frame 212-1 can be a signature for the I-frame 212-1. As such, in FIG. 2, the first sequence of signatures within GOP 1 210-1 represents the picture size of the I-frame 212-1 followed by the picture sizes of a plurality of B-frames and P-frames within GOP 1 210-1 in accordance with some embodiments. As explained above with reference to FIG. 2, the picture size parameter of the video frames cannot be predicted as it depends on encoder model, software version, picture type (e.g., I-frame vs. P-frame vs. B-frame), video content (e.g., detailed vs. few details), and/or video characteristics (e.g., static video vs. fast moving video). Thus, the sequence of the picture sizes as the first sequence of signatures is unpredictable and unique to the selected GOP.

The method 400 continues, as represented by block 420, with the fingerprint controller obtaining a second sequence of signatures for audio frames corresponding to the group of pictures. In some embodiments, as represented by block 422, the audio frames that correspond to the group of pictures are identified based on presentation timestamps of packets associated with the audio frames and the group of pictures. Further, in some embodiments, as represented by block 424, obtaining the second sequence of signatures for the audio frames corresponding to the group of pictures includes obtaining values at a plurality of locations within the audio frames, and recording the second sequence of signatures representing the values at the plurality of locations. For example, in FIG. 2, based on presentation timestamps, the audio frames starting from presentation timestamp B between the dashed lines 251-1 and 251-2 are identified as corresponding to the video frames for GOP 1 210-1 starting from presentation timestamp A. Upon identifying the corresponding audio frames, values at a plurality of locations within the identified corresponding audio frames are recorded as the second sequence of signatures for the corresponding audio frames in accordance with some embodiments.

In some embodiments, as represented by block 426, for enhanced protection, obtaining the second sequence of signatures for the audio frames corresponding to the group of pictures includes identifying addresses within the audio frames according to the first sequence of signatures, and obtaining the second sequence of signatures from values at the addresses. For example, in FIG. 2, having obtained the video fingerprints (e.g., the picture sizes) of the video frames within GOP 1 210-1, the server uses the sequence of the picture size values as addresses of locations within the corresponding audio frames (between the dashed lines 251-1 and 251-2) for locating values for the second sequence of signatures. Because the sequence of the video fingerprints (e.g., the picture sizes) of the video frames for GOP 1 210-1 is unpredictable, the addresses of locations within the access units are also unpredictable. Consequently, the values from such locations within the access units are unpredictable and the fingerprints generated based on the values from such locations are tamper resistant.

Still referring to FIG. 4, as represented by block 430, the method 400 includes combining the first sequence of signatures and the second sequence of signatures to generate a combined signature for the group of pictures and the audio frames corresponding to the group of pictures. In some embodiments, the server calculates the combined signature by applying a function to the sets of picture size values and compressed audio data values collected in steps represented by blocks 410 and 420.

As represented by block 440, the method 400 also includes embedding the combined signature in a transport stream for transmission. In some embodiments, as represented by block 442, embedding the combined signature in the transport stream for transmission includes composing a signaling packet instructing a receiving device (e.g., the client device 120 in FIG. 1) to start verifying the combined signature, and appending the signaling packet, including the combined signature, to a last audio packetized elementary stream packet for the audio frames corresponding to the group of pictures. For example, in FIG. 2, the server generates the signaling packet 240-2 that includes the combined signature. The signaling packet 240-2 includes at least one command instructing the client device to verify fingerprints for GOP 1 210-1 that starts at PTS A and audio PES that starts at PTS B. The server then injects the signaling packet 240-2 in the transport stream for transmission to the client device. As shown in FIG. 2, in some embodiments, the signaling packet 240-2 is placed at the end of the last audio PES packet 230-2 that corresponds to GOP 1 201-1.

Still referring to FIG. 4, in some embodiments, as represented by block 444, the fingerprint controller (or the fingerprint controller coordinating with the packetizer and/or the multiplexer) composes and embeds a signaling packet instructing the client device to start verifying the combined signature for the group of pictures and the audio frames, and at the same time, instructing the client device to start calculating a joint signature for another video-audio pair. Accordingly, in some embodiments, embedding the combined signature in the transport stream for transmission includes identifying a second group of pictures and a second set of audio frames corresponding to the second group of pictures, composing a signaling packet instructing the client device to start verifying the combined signature and start calculating a joint signature for the second group of pictures and the second set of audio frames, and embedding the signaling packet, including the combined signature, in the transport stream for transmission. Thus, for sequential operation, the single signaling packet 240-2 can carry at least two commands One command instructs the client device to start calculating the fingerprint for one video and audio pair, e.g., starting to calculate fingerprints for GOP 2 210-2 and its corresponding audio frames. Another command instructs the client device to verify the combined fingerprint for a different video and audio pair, e.g., for verifying GOP 1 210-1 that starts at PTS A and its corresponding audio PES starting at PTS B.

In some embodiments, as represented by block 450, the method 400 further includes composing and embedding a signaling packet instructing the client device to start calculating a joint signature for the group of pictures and the audio frames. As such, in some embodiments, the fingerprint controller composes a signaling packet instructing a receiving device (e.g., the client device 120 in FIG. 1) to start calculating a joint signature for the group of pictures starting at a first timestamp and the audio frames corresponding to the group of pictures starting at a second timestamp, and embedding the signaling packet in the transport stream for transmission. In some embodiments, as represented by block 452, the fingerprint controller causes the server (e.g., by coordinating with the packetizer and/or the multiplexer) to append the signaling packet to a first audio packetized elementary stream packet for the audio frames corresponding to the group of pictures.

For example, in FIG. 2, the server composes the signaling packet 240-1 and injects the signaling packet 240-1 in the transport stream for transmission to the client device. The signaling packet 240-1 includes a command that instructs the client device to start calculating fingerprints for GOP 1 210-1 starting at PTS A and for the corresponding audio PES starting at PTS B. Further as shown in FIG. 2, in some embodiments, the server appends the signaling packet 240-1 to the end of the first audio PES packet 230-1 that corresponds to GOP 1 210-1.

In some embodiments, as represented by block 460, for added security, the method 400 further includes encrypting the combined signature prior to transmission. In such embodiments, the signaling packet, e.g., the signaling packet 240-2 in FIG. 2, includes a command to instruct the client device to decrypt the combined signature prior to verifying the combined signature in accordance with some embodiments.

Figure 5:
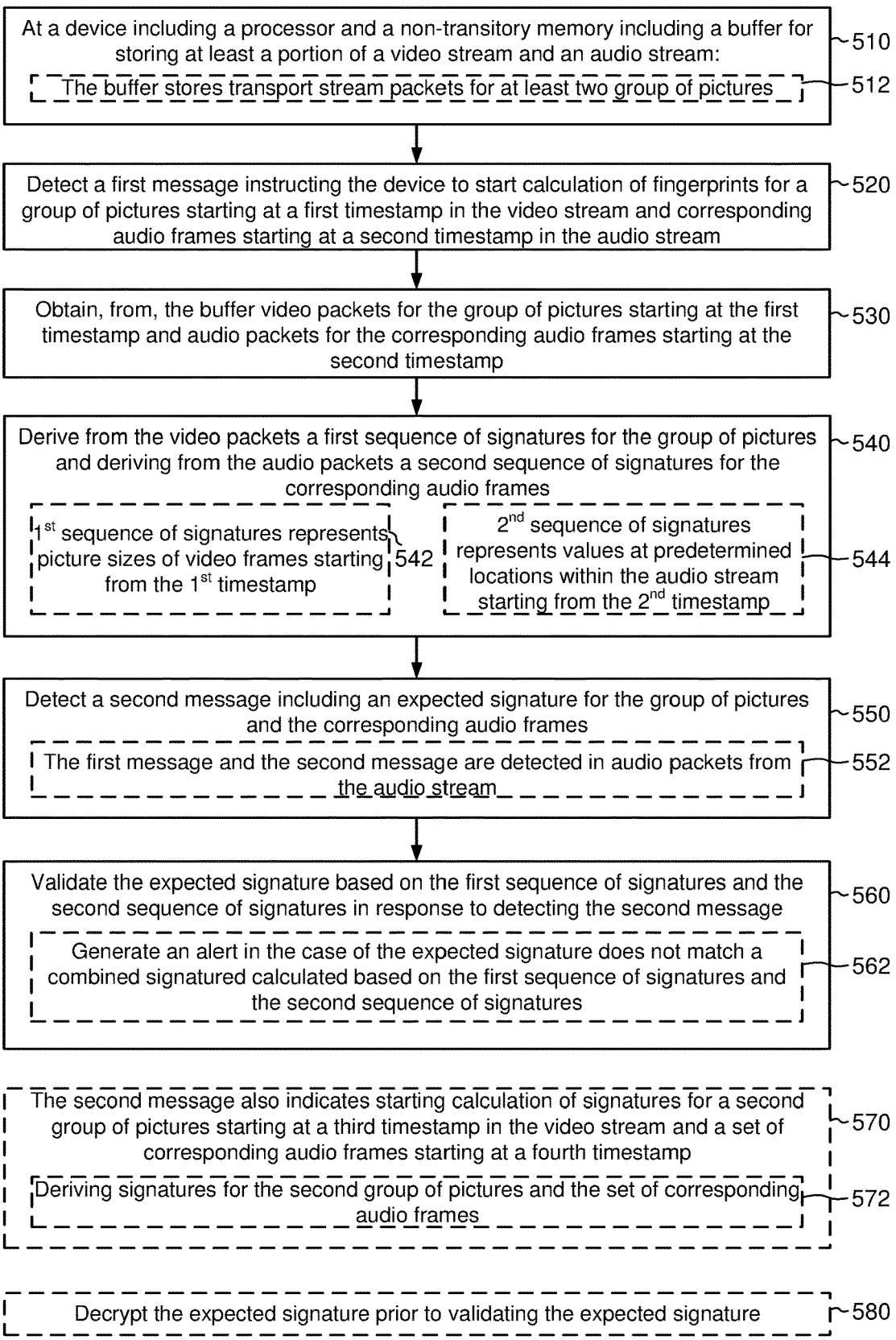
FIG. 5 is a flowchart illustrating an exemplary tamper detection method, in accordance with some embodiments.

FIG. 5 is a flowchart illustrating a tamper verification method 500 in accordance with some embodiments. In some embodiments, the tamper verification method 500 is performed on a client device, e.g., by the controller 122 on the client device 120 in FIG. 1. In some embodiments, as represented by block 510, the client device 120 includes a processor and a non-transitory memory to facilitate the tamper detection. In some embodiments, as represented by block 512, the non-transitory memory includes a buffer (e.g., the buffer 124 in FIG. 1) for storing at least a portion of a video stream and an audio stream. Briefly, the method 500 includes detecting a first message instructing the client device to start calculation of fingerprints for a group of pictures starting at a first timestamp in the video stream and corresponding audio frames starting at a second timestamp in the audio stream; obtaining, from the buffer, video packets for the group of pictures starting at the first timestamp and audio packets for the corresponding audio frames starting at the second timestamp; deriving, from the video packets, a first sequence of signatures for the group of pictures and deriving, from the audio packets, a second sequence of signatures for the corresponding audio frames; detecting a second message including an expected signature for the group of pictures and the corresponding audio frames; and validating the expected signature based on the first sequence of signatures and the second sequence of signatures in response to detecting the second message.

To that end, as represented by block 520, the method 500 includes detecting a first message indicating to the client device to start calculation of fingerprints for a group of pictures starting at a first timestamp in the video stream and corresponding audio frames starting at a second timestamp in the audio stream. In response to detecting the first message, as represented by block 530, the method 500 includes obtaining, from the buffer, video packets for the group of pictures starting at the first timestamp and audio packets for the corresponding audio frames starting at the second timestamp.

For example, in FIG. 3A, the client device detects the signaling packet 310-1 in the transport stream. The signaling packet 310-1 includes a command instructing the client device to start calculating fingerprints for GOP starting at PTS A and for the corresponding audio PES starting at PTS B. In response to detecting the signaling packet 310-1, as shown in FIG. 3B, the client device retrieves from the buffer video packets for the GOP 305 starting at PTS A (e.g., packets for the video frames 320) and audio packets for the corresponding audio frames starting at PTS B (e.g., packets for the audio frames 330).

As represented by block 540, the method 500 also includes deriving, from the video packets, a first sequence of signatures for the group of pictures and deriving, from the audio packets, a second sequence of signatures for the corresponding audio frames. For example, in FIG. 3B, the client device derives the sequence of signatures for the video fames $\{V_1, V_2, V_3, V_4, \ldots, V_{m-1},$ and $V_m\}$ and the sequence of signatures for the corresponding audio frames $\{A_1, A_2, A_3, \ldots, A_{n-1},$ and $A_n\}$. In some embodiments, as represented by block 542, the first sequence of signatures represents picture sizes of video frames starting from the first timestamp. As such, in some embodiments, the first sequence of signatures for the group of pictures represents pictures sizes of video frames within the group of pictures starting from the first timestamp.

In some embodiments, as represented by block 544, the second sequence of signatures represents values at predetermined locations within the audio stream starting from the second timestamp. As such, in some embodiments, the second sequence of signatures for the corresponding audio frames represents values at predetermined locations within the audio stream starting from the second timestamp. For example, in FIG. 3B, the sequence of signatures $\{V_1, V_2, V_3, V_4, \ldots, V_{m-1},$ and $V_m\}$ can represent the video frame fingerprints (e.g., the picture sizes) of the video frames $V_1$ 320-1, $V_2$ 320-2, $V_3$ 320-3, $V_4$ 320-4, $\ldots, V_{m-1}$ 320-x, and $V_m$ 320-y. In another example, in FIG. 3B, the sequence of signatures $\{A_1, A_2, A_3, \ldots, A_{n-1},$ and $A_n\}$ represents values in the compressed audio stream at predetermined locations, e.g., $3^{rd}$ byte in audio frame $A_1$ 330-1, $7^{th}$ byte in audio frame $A_2$ 330-2, etc. In some embodiments, for enhanced security, addresses of the predetermined locations in the compressed audio stream correspond to the first sequence of signatures for the group of pictures, e.g., picture sizes of the video frames in the video stream.

The method 500 continues, as represented by block 550, with the client device detecting a second message that includes an expected signature for the group of pictures and the corresponding audio frames. In some embodiments, as represented by block 552, the first message and the second message are detected in audio packets from the audio stream. For example, in FIG. 3C, the client device detects the signaling packet 310-2 that includes a message instructing the client device to start verifying fingerprints for GOP 305 that starts at PTS A and for the corresponding audio PES starting at PTS B. In some embodiments, both the signaling packet 310-1 and the signaling packet 310-2 are embedded by the server in an audio stream, e.g., among the audio TS packets 256 for the audio PES packets 254 in FIG. 2. In some other embodiments, the signaling packets can be embedded in a video stream (e.g., among the video TS packets 206, FIG. 2) or a separate (e.g., out-of-band) signaling path.

Still referring to FIG. 5, as represented by block 560, the method 500 includes validating the expected signature based on the first sequence of signatures and the second sequence of signatures in response to detecting the second message. For example, in FIG. 3C, in response to detecting the signaling packet 310-2, which includes the expected signature for the GOP 305 and the corresponding access units 330, the client device calculates a joint signature based on the sequence of signatures $\{V_1, V_2, V_3, V_4, \ldots, V_{m-1},$ and $V_m\}$ and the sequence of signatures $\{A_1, A_2, A_3, \ldots, A_{n-1},$ and $A_n\}$. The client device then compares the expected signature with the calculated joint signature to detect tampering.

In some embodiments, as represented by block 562, the client device generates an alert in the case of the expected signature does not match a combined signature calculated based on the first sequence of signatures and the second sequence of signatures. In other words, in some embodiments, validating the expected signature based on the first sequence of signatures and the second sequence of signatures includes determining whether or not the expected signature matches a combined signature calculated based on the first sequence of signatures and the second sequence of signatures, and generating an alert, e.g., displaying an alert for the user and/or blocking or obscuring the viewing, to indicate tampering in response to determining the expected signature does not match the combined signature.

In some embodiments, as represented by block 570, the second message also indicates to the client device to start calculation of fingerprints for a second group of pictures starting at a third timestamp in the video stream and a set of corresponding audio frames starting at a fourth timestamp. In such embodiments, as represented by block 572, and the method 500 further includes, in response to detecting the second message, obtaining from the buffer a plurality of video packets for the second group of pictures starting at the third timestamp and a plurality of audio packets for the set of corresponding audio frames starting at the fourth timestamp, and deriving a third sequence of signatures for the group of pictures from the plurality of video packets and a fourth sequence of signatures for the set of corresponding audio frames from the plurality of audio packets.

For example, though not shown, in FIG. 3C, for sequential operation, the single signaling packet 310-2 can also include a command as the second message directing the client device to start calculating fingerprints for another video and audio pair, e.g., for a video and audio pair that has a second group of pictures starting at a third timestamp in the video stream and a set of corresponding audio frames starting at a fourth timestamp. As a result, in response to receiving the single signaling packet 310-2, the client device not only validates the expected signature for the GOP 305, but also starts calculating the fingerprints for another video and audio pair.

In some embodiments, as represented by block 580, the method 500 further includes decrypting the expected signature prior to validating the expected signature. For example, the client device can apply a symmetric key to the expected signature for decryption prior to comparing the decrypted expected signature with the calculated joint signature. In another example, the client device can apply a private key to the expected signature for decryption prior to comparing the decrypted expected signature with the calculated joint signature.

Figure 6:
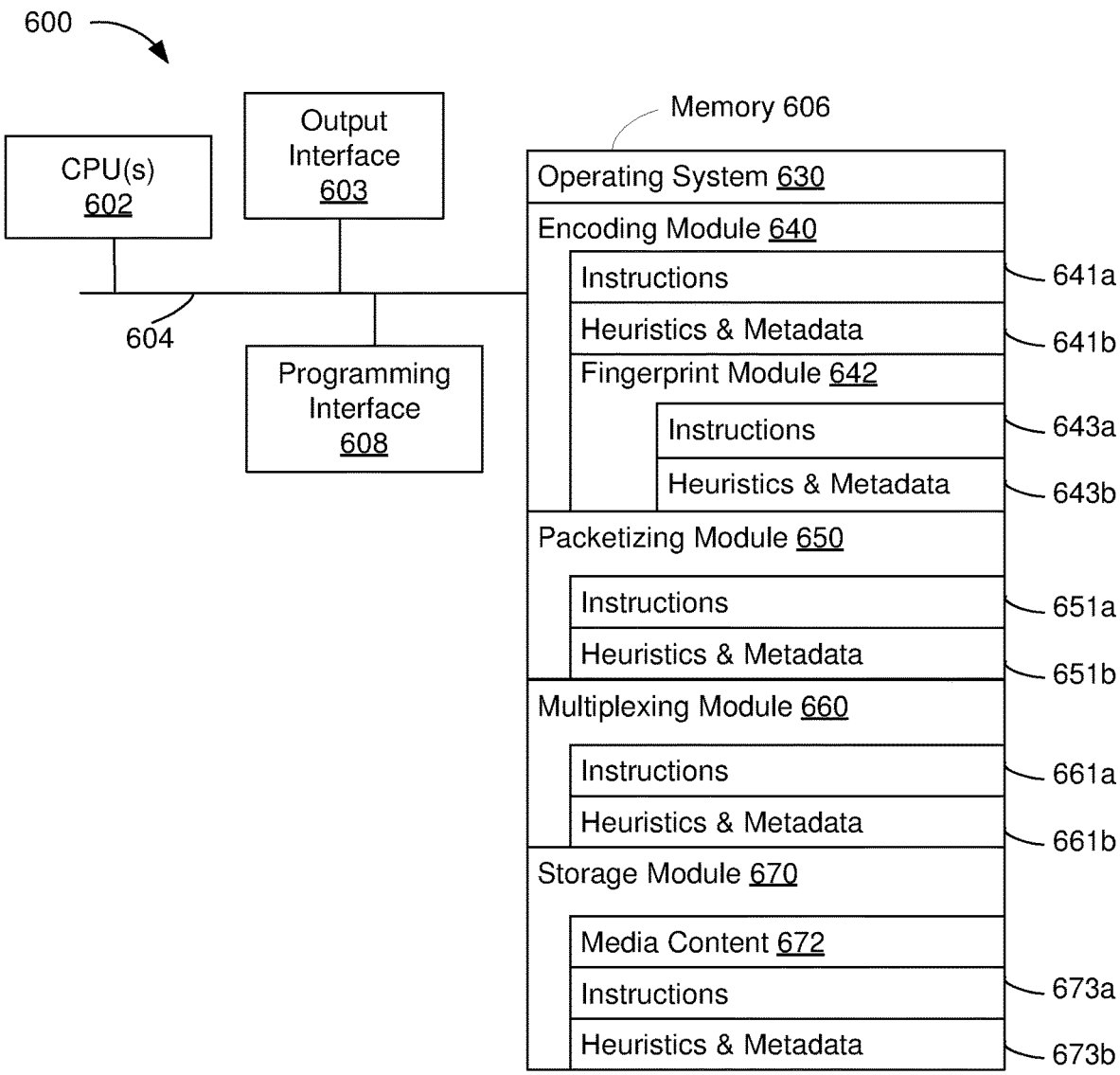
FIG. 6 is a block diagram of a computing device in accordance with some implementations.

FIG. 6 is a block diagram of a computing device 600 in accordance with some implementations. In some implementations, the computing device 600 corresponds to the server 110 of FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 602 (e.g., processors), one or more output interfaces 603 (e.g., a network interface), a memory 606, a programming interface 608, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630, an encoding module 640, a packetizing module 650, a multiplexing module 660, and a storage module 670. In some implementations, one or more instructions are included in a combination of logic and non-transitory memory. The operating system 630 includes procedures for handling various basic system services and for performing hardware dependent tasks.

In some implementations, the encoding module 640 (e.g., the encoder 112, FIG. 1) is configured to handle encoding of media content. To that end, the encoding module 640 includes a set of instructions 641$a$ and heuristics and metadata 641$b$. In some embodiments, the encoding module 640 includes a fingerprint module 642 (e.g., the fingerprint controller 130, FIG. 1) configured to handle fingerprinting of the media content for protection. To that end, the fingerprint module 642 includes a set of instructions 643$a$ and heuristics and metadata 643$b$.

In some implementations, the packetizing module 650 (e.g., the packetizer 114, FIG. 1) is configured to packetize media content data. To that end, the packetizing module 650 includes a set of instructions 651$a$ and heuristics and metadata 651$b$.

In some implementations, the multiplexing module 660 (e.g., the multiplexer 116, FIG. 1) is configured to multiplex the media content packets for transmission. To that end, the multiplexing module 660 includes a set of instructions 661$a$ and heuristics and metadata 661$b$.

In some implementations, the storage module 670 is configured to store and/or manage raw media content 672 (e.g., the content storage 101 and/or the live broadcast 102, FIG. 1). To that end, the storage module 670 includes a set of instructions 673$a$ and heuristics and metadata 673$b$.

Although the encoding module 640, the packetizing module 650, the multiplexing module 660, and the storage module 670 are illustrated as residing on a single computing device 600, it should be understood that in other embodiments, any combination of the encoding module 640, the packetizing module 650, the multiplexing module 660, and the storage module 670 can reside in separate computing devices in various implementations. For example, in some implementations each of the encoding module 640, the packetizing module 650, the multiplexing module 660, and the storage module 670 reside on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 7:
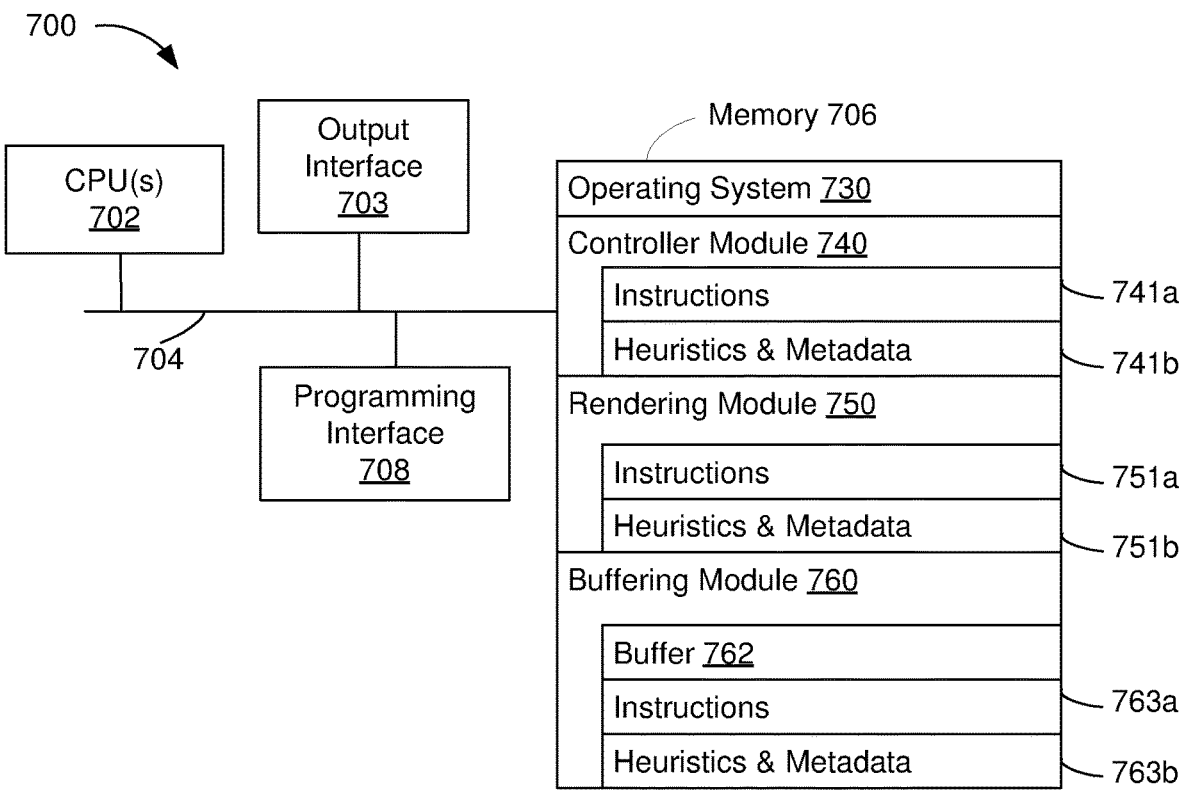
FIG. 7 is a block diagram of another computing device in accordance with some implementations.

FIG. 7 is a block diagram of a computing device 700 in accordance with some implementations. In some implementations, the computing device 700 corresponds to the client device 120 of FIG. 1 and performs one or more of the functionalities described above with respect to the client device 120. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors and/or controllers), one or more output interfaces 703 (e.g., a network interface), a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730, a controller module 740, a rendering module 750, and a buffering module 760. In some implementations, one or more instructions are included in a combination of logic and non-transitory memory. The operating system 730 includes procedures for handling various basic system services and for performing hardware dependent tasks.

In some implementations, the controller module 740 (e.g., the controller 122, FIG. 1) is configured to handle decoding and verification of media content. To that end, the controller module 740 includes a set of instructions 741$a$ and heuristics and metadata 741$b$.

In some implementations, the rendering module 750 (e.g., the player 126, FIG. 1) is configured to render the media content. To that end, the rendering module 750 includes a set of instructions 751$a$ and heuristics and metadata 751$b$.

In some implementations, the buffering module 760 is configured to manage received media content stored in a buffer 762 (e.g., the buffer 124, FIG. 1). To that end, the buffering module 760 includes a set of instructions 763a and heuristics and metadata 763b.

Although the controller module 740, the rendering module 750, and the buffering module 760 are illustrated as residing on a single computing device 700, it should be understood that in other embodiments, any combination of the controller module 740, the rendering module 750, and the buffering module 760 can reside in separate computing devices in various implementations. For example, in some implementations each of the controller module 740, the rendering module 750, and the buffering module 760 reside on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including one or more processors and a non-transitory memory:
obtaining a first sequence of signatures within a group of pictures, wherein a respective signature in the first sequence of signatures represents a characteristic of a respective video frame in the group of pictures;
obtaining a second sequence of signatures for audio frames corresponding to the group of pictures, wherein a respective signature in the second sequence of signatures represents a characteristic of a respective audio frame in the audio frames;
combining the first sequence of signatures and the second sequence of signatures to generate a joint signature for the group of pictures and the audio frames corresponding to the group of pictures; and
embedding the joint signature in a transport stream for transmission.

2. The method of claim 1, wherein the characteristic of the respective video frame represents a picture size of the respective video frame.

3. The method of claim 1, wherein the audio frames that correspond to the group of pictures are identified based on presentation timestamps of packets associated with the audio frames and the group of pictures.

4. The method of claim 1, wherein obtaining the second sequence of signatures for the audio frames corresponding to the group of pictures includes:
obtaining values at a plurality of locations within the audio frames; and
recording the second sequence of signatures representing the values at the plurality of locations.

5. The method of claim 1, wherein obtaining the second sequence of signatures for the audio frames corresponding to the group of pictures includes:
identifying addresses within the audio frames according to the first sequence of signatures; and
obtaining the second sequence of signatures from values at the addresses.

6. The method of claim 1, wherein embedding the joint signature in the transport stream for transmission includes:
composing a signaling packet instructing to start verifying the joint signature; and
appending the signaling packet, including the joint signature, to a last audio packetized elementary stream packet for the audio frames corresponding to the group of pictures.

7. The method of claim 1, wherein embedding the joint signature in the transport stream for transmission includes:

identifying a second group of pictures and a second set of audio frames corresponding to the second group of pictures;

composing a signaling packet instructing a receiving device to start verifying the joint signature and start calculating a second joint signature for the second group of pictures and the second set of audio frames; and embedding the signaling packet, including the combined second joint signature, in the transport stream for transmission.

8. The method of claim 1, further comprising:

composing a signaling packet instructing a receiving device to start calculating the joint signature for the group of pictures starting at a first timestamp and the audio frames corresponding to the group of pictures starting at a second timestamp; and embedding the signaling packet in the transport stream for transmission.

9. The method of claim 8, wherein embedding the signaling packet in the transport stream for transmission includes:

appending the signaling packet to a first audio packetized elementary stream packet for the audio frames corresponding to the group of pictures.

10. The method of claim 1, further comprising:

encrypting the joint signature prior to transmission.

11. A device comprising:

one or more processors;

a non-transitory memory; and one or more programs stored in the non-transitory memory, which, when executed by the one or more processors, cause the device to:

obtain a first sequence of signatures within a group of pictures, wherein a respective signature in the first sequence of signatures represents a characteristic of a respective video frame in the group of pictures;

obtain a second sequence of signatures for audio frames corresponding to the group of pictures, wherein a respective signature in the second sequence of signatures represents a characteristic of a respective audio frame in the audio frames;

combine the first sequence of signatures and the second sequence of signatures to generate a joint signature for the group of pictures and the audio frames corresponding to the group of pictures; and embed the joint signature in a transport stream for transmission.

12. A method comprising:

at a device including a processor and a non-transitory memory including a buffer for storing at least a portion of a video stream and an audio stream:

detecting a first message instructing the device to start calculation of fingerprints for a group of pictures starting at a first timestamp in the video stream and audio frames corresponding to the group of pictures starting at a second timestamp in the audio stream;

obtaining, from the buffer, video packets for the group of pictures starting at the first timestamp and audio packets for the audio frames corresponding to the group of pictures starting at the second timestamp;

deriving, from the video packets, a first sequence of signatures for the group of pictures representing characteristics of the group of pictures and deriving, from the audio packets, a second sequence of signatures for the corresponding audio frames representing characteristics of the audio packets;

detecting a second message including an expected joint signature for the group of pictures and the corresponding audio frames; and validating the expected joint signature based on the first sequence of signatures and the second sequence of signatures in response to detecting the second message.

13. The method of claim 12, wherein the buffer stores transport stream packets for at least two groups of pictures.

14. The method of claim 12, wherein the first sequence of signatures for the group of pictures represents picture sizes of video frames within the group of pictures starting from the first timestamp.

15. The method of claim 12, wherein the second sequence of signatures for the corresponding audio frames represents values at predetermined locations within the audio stream starting from the second timestamp.

16. The method of claim 12, wherein the first message and the second message are detected in audio packets from the audio stream.

17. The method of claim 12, wherein validating the expected signature based on the first sequence of signatures and the second sequence of signatures includes:

determining whether or not the expected signature matches a joint signature calculated based on the first sequence of signatures and the second sequence of signatures; and generating an alert to indicate tampering in response to determining the expected signature does not match the joint signature.

18. The method of claim 12, wherein the second message also instructs the device to start calculation of signatures for a second group of pictures starting at a third timestamp in the video stream and a set of corresponding audio frames starting at a fourth timestamp, and the method further includes, in response to detecting the second message:

obtaining, from the buffer, a plurality of video packets for the second group of pictures starting at the third timestamp and a plurality of audio packets for the set of corresponding audio frames starting at the fourth timestamp; and deriving a third sequence of signatures for the group of pictures from the plurality of video packets and a fourth sequence of signatures for the set of corresponding audio frames from the plurality of audio packets.

19. The method of claim 12, further comprising decrypting the expected signature prior to validating the expected signature.

20. A device comprising:

a processor;

a non-transitory memory including a buffer for storing at least a portion of a video stream and an audio stream; and one or more programs stored in the non-transitory memory, which, when executed by the processor, cause the device to:

detect a first message instructing the device to start calculation of fingerprints for a group of pictures starting at a first timestamp in the video stream and audio frames corresponding to the group of pictures starting at a second timestamp in the audio stream;

obtain, from the buffer, video packets for the group of pictures starting at the first timestamp and audio packets for the audio frames corresponding to the group of pictures starting at the second timestamp;

derive, from the video packets, a first sequence of signatures for the group of pictures representing characteristics of the group of pictures and deriving, from the audio packets, a second sequence of signatures for the corresponding audio frames representing characteristics of the audio packets;

detect a second message including an expected joint signature for the group of pictures and the corresponding audio frames; and validate the expected joint signature based on the first sequence of signatures and the second sequence of signatures in response to detecting the second message.

* * * * *